No. 830,301. PATENTED SEPT. 4, 1906.
J. A. CLARK.
COMBINED COOP AND BROODER FOR YOUNG CHICKENS.
APPLICATION FILED OCT. 23, 1905.
3 SHEETS—SHEET 1.
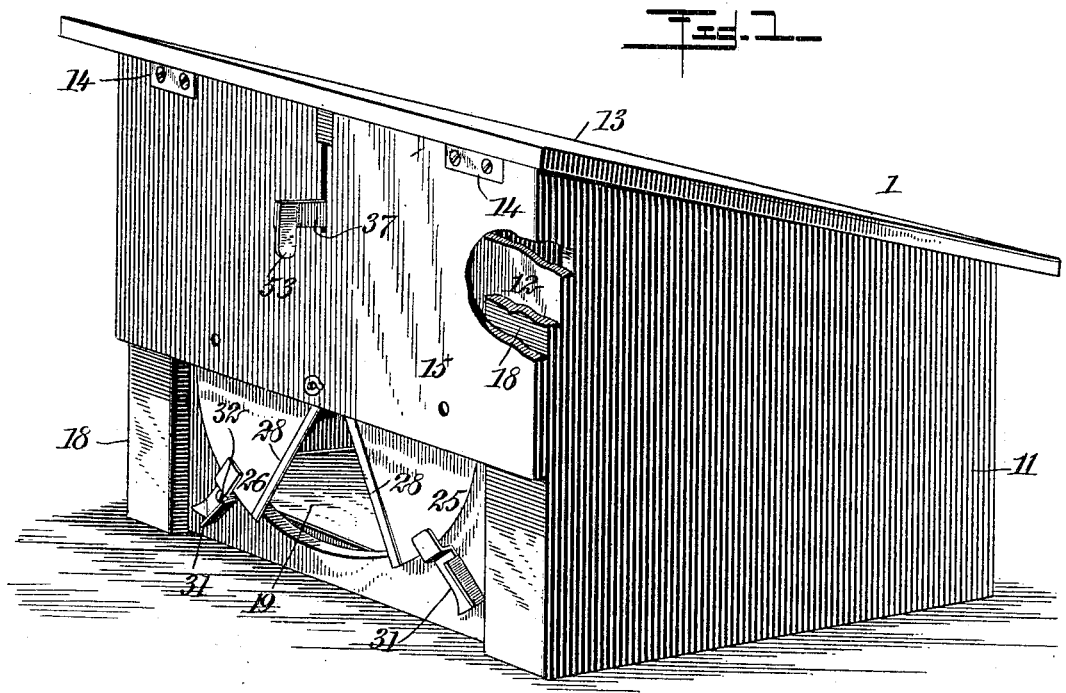
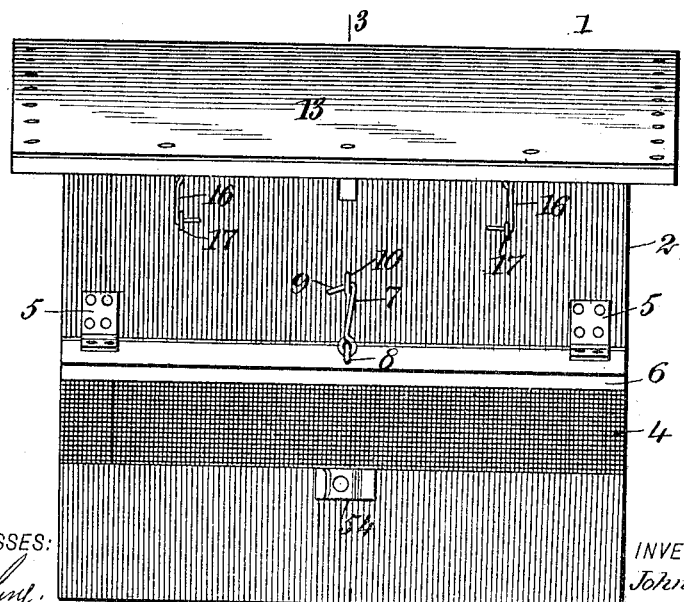
WITNESSES:
INVENTOR
John Addison Clark
BY
ATTORNEYS

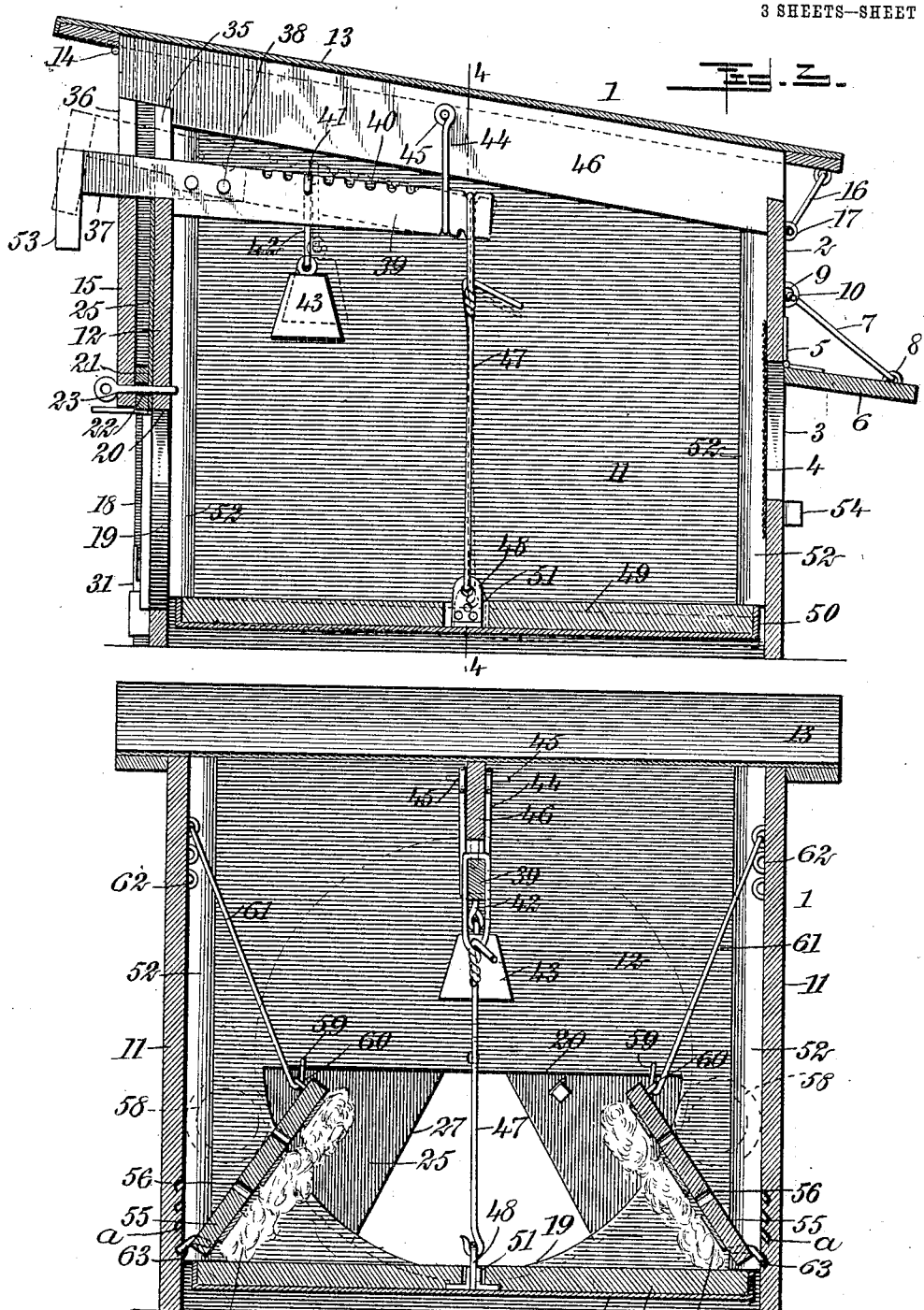

No. 830,301. PATENTED SEPT. 4, 1906.
J. A. CLARK.
COMBINED COOP AND BROODER FOR YOUNG CHICKENS.
APPLICATION FILED OCT. 23, 1905.

3 SHEETS—SHEET 3.

WITNESSES:

INVENTOR
John Addison Clark
BY
ATTORNEYS

UNITED STATES PATENT OFFICE.

JOHN ADDISON CLARK, OF BOLCKOW, MISSOURI.

COMBINED COOP AND BROODER FOR YOUNG CHICKENS.

No. 830,301.         Specification of Letters Patent.         Patented Sept. 4, 1906.

Application filed October 23, 1905. Serial No. 283,969.

*To all whom it may concern:*

Be it known that I, JOHN ADDISON CLARK, a citizen of the United States, and a resident of Bolckow, in the county of Andrew and State of Missouri, have invented a new and Improved Combined Coop and Brooder for Young Chickens, of which the following is a full, clear, and exact description.

This invention relates to poultry culture; and it consists, substantially, in the details of construction and combinations of parts hereinafter more particularly described, and pointed out in the claims.

The invention has reference more especially to combined coops and brooders for use in poultry culture in the rearing of young chickens hatched in incubators; and one of the principal objects thereof is to provide a structure of this kind of an embodiment to overcome numerous disadvantages and objections encountered in the use of many other structures of the kind hitherto devised.

A further object of the invention is to provide a structure of the character referred to which is simple in its embodiment and comparatively inexpensive to manufacture, besides being effective and reliable in operation, easy of access for any purpose desired, amply ventilated, readily cleansed, and requiring the minimum of time and labor on the part of the operator in looking after same, besides possessing the capacity for long and repeated service.

The above and additional objects are attained by means substantially such as are illustrated in the accompanying drawings, in which—

Figure 5:
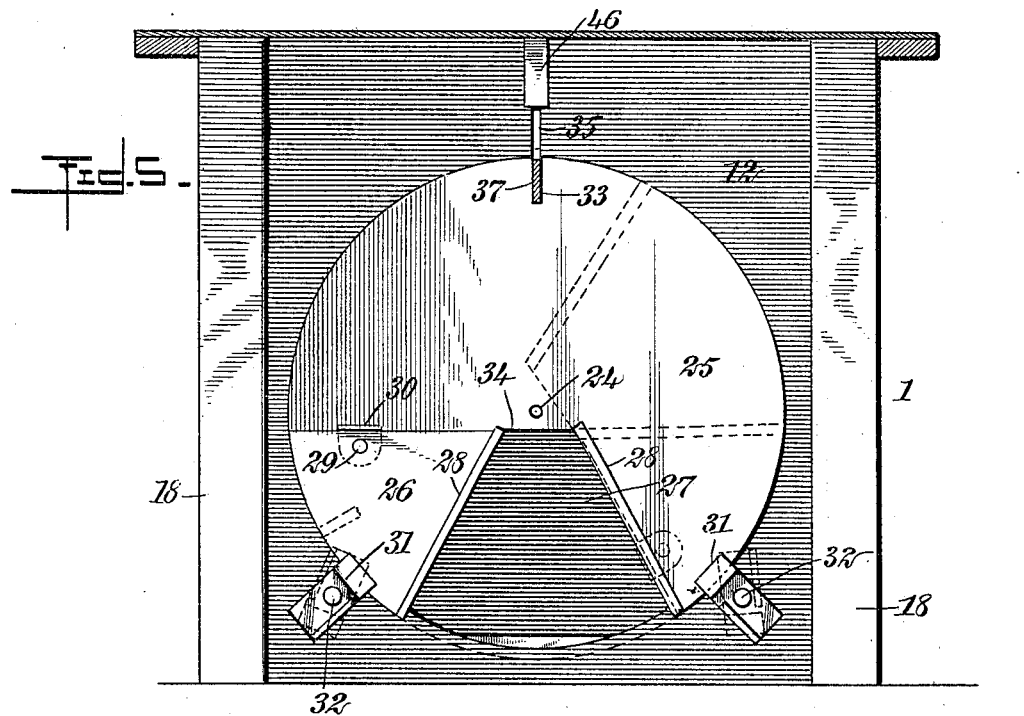
Figure 6:
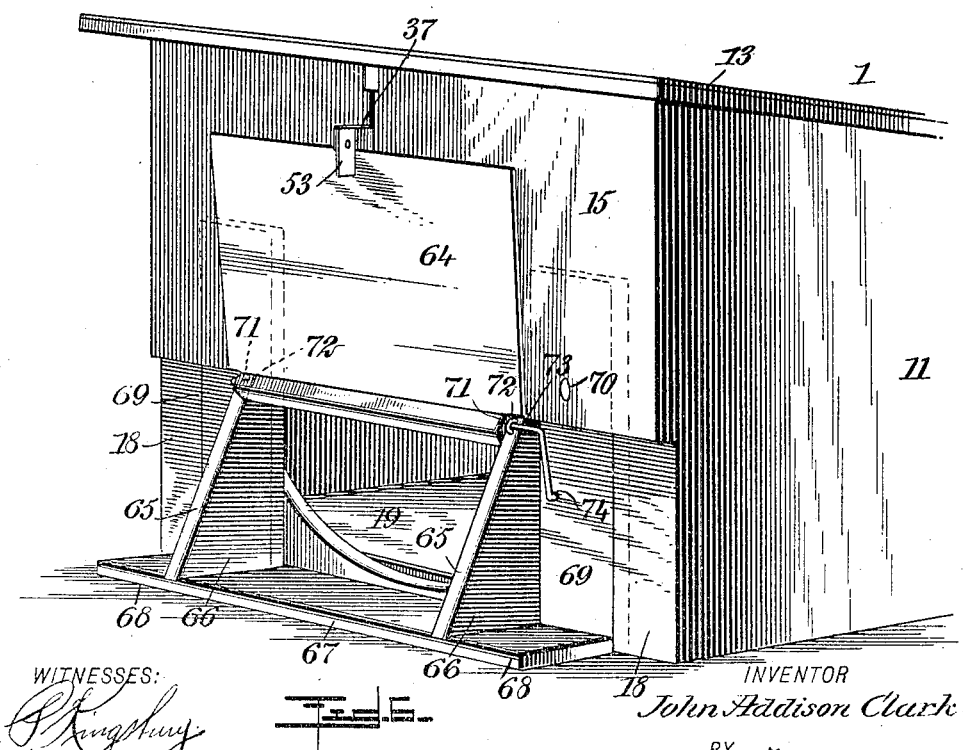

Figure 1 is a perspective view of a combined coop and brooder embodying my improvements, showing one of two forms of automatically-operated closures or doors which may be employed at the entrance of the structure. Fig. 2 is a rear end view thereof, showing the shutter for the ventilating device in open position. Fig. 3 is a sectional view on the line 3 3 of Fig. 2. Fig. 4 is a longitudinal sectional view on the line 4 4 of Fig. 3. Fig. 5 is a front elevation, the outer front wall of the structure being removed to more clearly indicate the construction and operation of one of the forms of closure or door employed at the entrance of the structure; and Fig. 6 is a perspective view showing the other of the two forms of closures or doors which may be employed at the entrance of the structure.

Before proceeding with a more detailed description it may be stated that in each of the forms of my improvements herein shown I employ a combined coop and brooder of special construction, embodying special means for preventing overcrowding of the young chicks in the compartment therefor in the structure, due to which hitherto poultrymen or culturists have incurred considerable losses by frequent smothering of the chicks in large numbers, it being a peculiarity of the chicks to crowd together in small space within a coop or brooder, however ample the housing provisions for them may be. For instance, in a coop or brooder constructed with a number of compartments for the young chicks they (the chicks) will all crowd together in one, two, or more of the compartments until there is no space remaining therein for any more, leaving perhaps as many more compartments entirely unoccupied or vacant. This is all entirely overcome by my improvements. I also employ a specially-constructed hover for the young chicks, the elements or parts of which may be readily removed from the structure for the purpose of airing and fumigating the same, it being here mentioned that the special means first above referred to include a specially-constructed bottom or floor for the structure, which may also be readily removed at any time for any purpose desired. Special means are also employed for ventilating the structure, and while I have herein represented my improvements in certain preferred embodiments it will be understood that I am not limited thereto in precise detail, since immaterial changes therein may be resorted to coming within the scope of my invention.

Reference being had to the drawings by the designating characters thereon, 1 represents my combined chicken coop and brooder in entirety, the same being preferably rectangular in form and of any desired dimensions as well as of any desired material, it being understood, however, that wood is the material employed for the structure in most part. Referring to Figs. 2 and 3, 2 designates the rear end wall of the structure, which, as shown, is formed, preferably, all the way across with an opening 3, over which is placed a screen 4, of reticulated material—as wire-gauze, for instance—secured to the inner side of said wall 2 in any suitable manner. The said opening 3 is provided at the outer upper edge thereof, near the sides of the structure, with hinges 5, secured to the outer surface of the said wall 2 and by means of which a shutter 6 is hung in such position with reference to the opening as that the latter may be entirely closed whenever desired in an obvious manner. Whenever the interior of the structure is to be ventilated, however, said shutter 6 may be carried to the open position shown in Figs. 2 and 3 for the purpose of enabling access of air to the interior thereof, the same being held in such position by any suitable means (herein shown to be a hook 7) movably held at one end in an eye 8 on the shutter, the bill or other end 9 thereof being received in another eye 10, inserted in the upper part of the said rear wall 2.

The two sides of my combined coop and brooder are indicated at 11, (see Figs. 3 and 4,) while the main front wall of the structure is indicated at 12, (see Figs. 3 and 4,) it being observed that this wall is of greater height than the rear wall 2, the upper edges of the said sides 11 being rearwardly inclined in conformity with the difference of height between the two said walls, the top or upper part of the structure being closed by means of a lid or cover 13, hinged at 14 to the outer surface of a supplementary front wall 15, the lower edge of which terminates in a plane considerably above the plane of the lower edge of the said front wall 12, it being observed that the lid or cover 13 may be securely held in place by means of hooks 16, suspended from the projecting rearward edge portion thereof and engaging with eyes 17, inserted at the proper place in the outer surface of the rear wall 2 of the structure. The said main and supplementary front walls 12 and 15 are separated from each other by means of vertical strips 18 disposed therebetween for practically the full height of the structure and located on opposite sides of an opening 19, formed in the lower portion of the said main front wall 12, said opening constituting the entrance through which the young chicks pass to the interior of the structure and being preferably substantially semicircular in form, the upper straight edge 20 thereof being substantially in parallelism with the lower edge of the said supplementary wall 15. Fitting between the two said front walls 12 and 15, substantially central of the lower edges thereof, is a block 21, having therein an opening 22 coinciding with corresponding openings in these walls and through all of which openings extends a pin or bolt 23, likewise extending through a coinciding opening 24, formed in the center of a swing plate or disk 25, which is adapted to turn thereon, as will presently be explained. This swing plate or disk 25 has cut therefrom a triangular section 26 by which to provide a triangular slot 27 therein, the edges of which are preferably turned and flattened at 28, so as to strengthen or reinforce the same. In order that said swing plate or disk 25 may be rendered heavier on one side of the triangular slot 27 therein than on the other, thus to cause the same to normally swing or gravitate to a position to close the opening or entrance 19 to the structure, any suitable means may be employed, preferably herein shown as the removed triangular section of the swing-plate, which is secured in proper position upon the latter, by having one of its edges fastened by one of the flattened edges of the slot 27 and also by means of a rivet 29, employed for securing to the outer face of the swing-plate a finger-piece 30 for enabling the said swing-plate to be carried to any desired position by the operator. The swing plate or disk 25 is held closely to the outer face of the said main front wall of the structure by means of buttons 31, secured at proper places adjacent to the lower edge of the said opening or entrance 19 by means of screws 32 and being adjustable thereon, as shown in dotted lines, Fig. 5, the upper ends thereof being bent or turned over the edge of the swing-plate in such manner as also to serve to guide the latter in any movement it may have imparted thereto in operation. The swing-plate is formed from the edge thereof with a radially-disposed notch 33, the same being practically in line with the center of the base 34 of the said slot 27, and whenever it is desired that the young chicks may have access to the interior of the structure the swing-plate is turned by the operator through the medium of the finger-piece 30, so as to bring the said notch 33 in line or registry with corresponding vertically-disposed slots 35 and 36, formed in the upper part of the said main front wall 12 and the supplementary front wall 15, respectively, and through which notch and slots projects the forward end of a locking member 37 for the swing-plate, the rearward or inner end of which is secured in any suitable way, as by means of rivets 38, to a balance-beam 39, which is provided at suitable intervals on the upper edge thereof with notches 40, in any one of which may be placed the hooked end 41 of a suspensory device 42 for an ordinary weight or balance 43, (see Fig. 3,) said balance-beam being pivotally suspended within the structure at or near the inner end thereof by means of a suspensory device 44, pivoted at 45 to a supporting-beam 46, disposed substantially centrally of the sides 11 and the ends of which are notched and seated in corresponding notches therefor formed in the said rear wall 2 and the said main and supplementary front walls 12 and 15 at the upper edge thereof. Attached also to the inner end of the said balance-beam 39 is the upper end of a suspensory device 47, to the lower end of which is loosely or pivotally supported, by means of a plate 48, the bottom of the structure, preferably constructed of a wooden floor 49, fitted closely within a metal pan or sheathing 50, it being noted that the said plate 48 is secured to the sheathing and projects upwardly through an opening 51 in the floor and that the connection between the said suspensory device and bottom is practically at the central point of the latter, the purpose of which will be presently explained. The interior of the structure is provided at the corners thereof with close-fitting vertically-disposed strips 52, the lower ends of which terminate short of or a suitable distance from the lower edges of the front, sides, and rear of the structure, and it will be seen that the weight 43 on the balance-beam 39 normally maintains the said bottom of the structure in elevated position to abut at the corners thereof against the said lower ends of the strips 52.

The projecting end of the locking member 37 for the swing-plate is preferably provided with a downward extension 53 for enabling the said member and balance-beam 39 to be manipulated by the operator from without as occasion may require, and it may be mentioned at this point that a suitable rotatable button 54 may be employed at the lower edge of the opening 3 in the rear wall 2 of the structure for locking the shutter 6 in position when closed.

I also sometimes employ in connection with my improved structure a hover for the young chicks, constructed, preferably, of two sections of wooden blocks 55, each being of width substantially equaling one-half of the width of the bottom of the structure and of length substantially equaling that of the said bottom, so that when laid flatwise upon the bottom the two said sections will practically cover the upper surface of the bottom for the full interior of the structure. The sections are formed with numerous holes or perforations 56, (see Fig. 4,) and each of them is provided on its inner surface with a covering 57 of wool or similar material for the purpose of accumulating heat emanating from suitable heated bodies, as bricks or bottles 58 of hot water, which may be placed in position in the space formed between the sides of the structure and said sections, it being observed that the latter are adjustably held in reversely-inclined positions by means of hooks 59 entering eyes 60 at or near the inner edges thereof, and the upper ends of the shanks 61 of which may be adjustably engaged in corresponding ones of oppositely-disposed sets of eyes 62, secured in the inner surfaces of the said sides 11 of the structure. The outer edges of the sections 55 may if desired be provided with one or more pins 63 to serve practically as feet for supporting the same in inclined relation to each other, said pins entering any desired ones of openings a to prevent any of the weight of the block-sections 55 being imposed upon the floor 49. It will be seen that the sections 55 may be adjusted with reference to each other according to the adjustment of the ends of the shanks 61 of the hooks, as already indicated, and as may be desired in practice.

From the foregoing description it will be seen that when the swing-plate 25 has been carried to the position thereof indicated in Figs. 3, 4, and 5 the same will be held therein in virtue of the locking connection therewith of the member 37 carried by the balance-beam 39. Now by setting the weight or balance 43 in such position on the balance-beam as that a determinate weight will be required to be placed upon the bottom of the structure by which to depress the inner end of the balance-beam, and thereby lift the locking member 37 out of the notch 33 of the swing-plate, it will at once be seen that the latter will be caused to be operated to close the opening or entrance 19 to the structure whenever a certain number of young chicks have entered the latter, the sizes and combined weight of which are known to the operator by which to enable him to adjust the balancing devices in such manner as that the desired operation will surely take place automatically, thus to prevent overcrowding of the interior or the structure by the chicks. By disposing any desired number of my improved structures alongside of each other practically as one structure it is apparent that the operator may care for almost any number of chicks that may be placed therein from the incubator.

As shown in Fig. 6, instead of employing the form of closure hereinbefore described for the opening or entrance 19 of the structure, I may sometimes employ a downwardly-swinging gate 64, which when it is in lowered or closed position rests upon the forwardly and downwardly inclined edges 65 of side members 66, secured at their lower ends to a sill 67, extending transversely of the structure at the front thereof, said sill being provided at the inner edges of the projecting end portions 68 thereof with uprights 69, fitting closely against the lower portion of the main front wall 12 at the sides of the said opening or entrance 19, flushly with the hereinbefore-mentioned upright strips 18 employed for spacing apart the said front wall 12 and the supplementary front wall 15, the upper portions of said uprights 69 being received within the space established by said vertical strips 18, suitable screws 70 or other fastenings being employed to secure the uprights in place. The gate 64 is provided at opposite corners thereof with lugs 71 having suitable holes (not shown) therein, which register with eyes 72, secured in the inclined edges 65 of the said members 66 at the upper ends thereof, a rod 73 being passed through the said registering holes and eyes by which to form a hinged support for the gate, said rod being provided at one end thereof with a crank or handle 74 for enabling ready removal of the same whenever it may be desired to remove the gate from position. The said gate is held in its open position before the opening or entrance of the structure by means of the downward extension 53 from the locking member 37, and it is apparent that in this form of my improvements whenever the weight of the chickens imposed upon the movable bottom of the structure overcomes the weight or balance 43 of the balance-beam 39 the opening or entrance to the structure will be closed precisely in the same way as explained in the embodiment of my invention shown in Figs. 1 to 5 inclusive.

It will further be seen that the bottom of the structure is so supported within the latter as that the balance beam and weight or balance 43 will be sensitive to weight imposed upon the said bottom at any part thereof, thus rendering my improvements operative even though the number of chickens which go into the structure may be unequally distributed over the bottom.

It is thought that the advantages of my improvements will be seen and that the construction and operation of the several parts or elements thereof will be fully understood without further detailed description thereof.

Having thus described my invention, I claim as new and desire to secure by Letters Patent—

1. A structure of the character specified, comprising a coop having an entrance for young chicks, and provided with a movable floor, a closure for the entrance, means for maintaining the closure from before the entrance, and means for releasing the same automatically to close the entrance, actuated by the weight of a determinate number of chicks upon the floor.

2. A structure of the character specified, comprising a coop having an entrance for young chicks, and provided with a movable floor, a swinging closure for the entrance, means for maintaining the closure from before the entrance, and means for releasing the same automatically to close the entrance, actuated by the weight of a determinate number of chicks upon the floor.

3. A structure of the character specified, comprising a coop having an entrance for young chicks and provided with a movable floor, a weighted closure for the entrance, means for maintaining the closure from before the entrance, and means for releasing the same automatically to close the entrance, actuated by the weight of a determinate number of chicks upon the floor.

4. A structure of the character specified, comprising a coop having an entrance for young chicks and provided with a movable floor, a swinging weighted closure for the entrance, means for maintaining the closure from before the entrance, and means for releasing the same automatically to close the entrance, actuated by the weight of a determinate number of chicks upon the floor.

5. A structure of the character specified, comprising a coop having an entrance for young chicks and provided with a movable floor, a closure for the entrance, means for maintaining the closure from before the entrance, and means for releasing the same automatically to close the entrance, actuated by the weight of a determinate number of chicks upon the floor, said closure being provided with an opening for registering with the entrance.

6. A structure of the character specified, comprising a coop having an entrance for young chicks and provided with a movable floor, a closure for the entrance, means for maintaining the closure from before the entrance, and means for releasing the same automatically to close the entrance, actuated by the weight of a determinate number of chicks upon the floor, said closure being provided with an opening for registering with the entrance, and weighted on one side of the opening.

7. A structure of the character specified, comprising a coop having an entrance for young chicks, and provided with a movable floor, a closure for the entrance, means for maintaining the closure from before the entrance, means for releasing the same automatically to close the entrance, actuated by the weight of a determinate number of chicks upon the floor, said closure being constructed of a rotatable disk having a section cut therefrom to form an opening for registering with the entrance, and weighted on one side of the opening.

8. A structure of the character specified, comprising a coop having an entrance for young chicks and provided with a movable floor, a closure for the entrance, a locking member therefor, adapted to maintain the closure from before the entrance, a balance-beam by which said locking member is carried, a weight on said beam, a suspensory device for the beam, and another suspensory device for the floor from the beam.

9. A structure of the character specified, comprising a coop having a main front wall provided wth an entrance for young chicks, a supplementary front wall, the lower edge of which terminates at the upper edge of said entrance, the said coop being provided with a movable floor, and the said main and supplementary front walls being formed with corresponding vertical slots from their upper edges, a closure for the entrance, formed with a notch adapted to be carried into registry with the said vertical slots, means for maintaining the closure from before the entrance, embodying a locking member for the closure adapted to enter said slots and notch, a balance-beam by which the locking member is carried, a weight on the balance-beam, a suspensory device for the latter, and a suspensory device for the floor from the said balance-beam.

10. A structure of the character specified, comprising a coop having an entrance for young chicks and provided with a movable floor, a gravity-closure for the entrance, means for maintaining the closure from before the entrance, and means for releasing the same automatically to close the entrance, actuated by the weight of a determinate number of chicks upon the floor.

11. A structure of the character specified, comprising a coop having an entrance for young chicks and provided with a vertical movable floor, means limiting the upward movement of the floor, a closure for the entrance, means for maintaining the closure from before the entrance, and means for releasing the same automatically to close the entrance, actuated by the weight of a determinate number of chicks upon the floor.

12. A structure of the character specified, comprising a coop having an entrance for young chicks and provided with a movable floor, a closure for the entrance, means for maintaining the closure from before the entrance, means for releasing the same automatically to close the entrance, actuated by the weight of a determinate number of chicks upon the floor, and strips fitted in the corners of the coop with the lower ends thereof terminating short of the base line of the structure, constituting stops for limiting the upward movement of the floor.

13. A structure of the character specified, comprising a coop having an entrance for young chicks and provided with a movable floor, an incasing-pan for the floor, a closure for the entrance, means for maintaining the closure from before the entrance, means for releasing the same automatically to close the entrance, actuated by the weight of a determinate number of chicks upon the floor, and strips fitted in the corners of the coop with the lower ends thereof terminating short of the base line of the structure, and constituting stops for limiting the upward movement of the floor.

14. A structure of the character specified, comprising a coop having an entrance for young chicks and provided with a movable floor, a closure for the entrance, means for maintaining the closure from before the entrance, means for releasing the same automatically to close the entrance, actuated by the weight of a determinate number of chicks upon the floor, said coop also having an opening in the rear wall thereof, and provided with a shutter and a screen-covering for said opening.

15. A structure of the character specified, comprising a coop having an entrance for young chicks, and provided with a movable floor, a closure for the entrance, means for maintaining the closure from before the entrance, and means for releasing the same automatically to close the entrance, actuated by the weight of a determinate number of chicks upon the floor, said coop being also provided interiorly thereof with a hover for the chicks.

16. A structure of the character specified, comprising a coop having an entrance for chickens, and provided with a movable floor, a closure for the entrance, a balance-beam, a connection between the beam and floor, and a locking member for the closure, operated by the balance-beam.

17. A structure of the character specified, comprising a coop having an entrance for chickens and provided with a movable floor, a closure for the entrance, a balance-beam, a connection between the beam and floor, and a member secured to the beam and projecting out through the side of the coop, said member engaging the closure to hold it from before the entrance.

18. A structure of the character specified, comprising a coop having an entrance for chickens and provided with a movable floor, a swinging closure for the entrance, a notched beam pivotally suspended in the upper part of the coop, a connection between one end of the beam and floor, a weight having a suspensory device engaging a notch of the beam, and a locking member for the closure secured to the beam and projecting out through the coop and provided with a downwardly-projecting extension at its end.

In testimony whereof I have signed my name to this specification in the presence of two subscribing witnesses.

JOHN ADDISON CLARK.

Witnesses:
R. H. CARTER,
JAS. A. JOHNSTON.